United States Patent

Sternsher

[11] Patent Number: 5,154,503
[45] Date of Patent: Oct. 13, 1992

[54] PHOTOGRAPHIC LIGHT MODIFIER

[75] Inventor: Daniel M. Sternsher, Perrysburg, Ohio

[73] Assignee: F. J. Westcott Company, Toledo, Ohio

[21] Appl. No.: 667,183

[22] Filed: Mar. 11, 1991

[51] Int. Cl.⁵ .................. F21V 21/00; G03B 15/02
[52] U.S. Cl. .......................... 362/16; 362/3; 362/7; 362/18; 362/320; 362/352
[58] Field of Search ............ 362/3, 7, 16, 17, 18, 362/319, 320, 352, 298, 351, 356, 357, 358

[56] References Cited

U.S. PATENT DOCUMENTS

| | | | |
|---|---|---|---|
| 1,935,045 | 11/1933 | Doane | 362/18 |
| 2,105,225 | 1/1938 | Pollock . | |
| 2,193,485 | 3/1940 | Kenning | 362/18 |
| 2,205,860 | 6/1940 | Olds . | |
| 2,794,906 | 6/1957 | Edgerton . | |
| 3,294,962 | 12/1966 | Hilzen . | |
| 3,429,320 | 2/1969 | Edelkind . | |
| 3,430,546 | 3/1969 | Holt | 362/18 |
| 3,781,535 | 12/1973 | Larson . | |
| 3,851,164 | 11/1974 | Intrator . | |
| 3,870,874 | 3/1975 | Larson . | |
| 3,873,821 | 3/1975 | Larson . | |
| 3,939,340 | 2/1976 | Gozzano . | |
| 4,052,607 | 10/1977 | Larson | 362/18 |
| 4,075,472 | 2/1978 | Higuchi | 362/255 |
| 4,109,301 | 8/1978 | Wakimura | 362/16 |
| 4,187,531 | 2/1980 | Lowell et al. | 362/17 |
| 4,409,646 | 10/1983 | Baliozian | 362/18 |
| 4,428,030 | 1/1984 | Baliozian | 362/18 |
| 4,443,837 | 4/1984 | Migliori et al. | 362/16 |
| 4,446,506 | 5/1984 | Larson | 362/17 |
| 4,460,946 | 7/1984 | Tinz | 362/18 |
| 4,464,708 | 8/1984 | Nussli et al. | 362/17 |
| 4,504,888 | 3/1985 | Rosenthal | 362/17 |
| 4,524,405 | 6/1985 | Heard | 362/18 |
| 4,594,645 | 6/1986 | Terashita | 362/18 |
| 4,633,374 | 12/1986 | Waltz et al. | 362/17 |
| 4,757,425 | 7/1988 | Waltz | 362/18 |
| 4,807,089 | 2/1989 | Nüssli | 362/17 |
| 4,855,874 | 8/1989 | Waltz | 362/16 |

FOREIGN PATENT DOCUMENTS 0159594 4/1985 European Pat. Off. .
1048681 12/1953 France .
379004 3/1940 Italy ................... 362/352

Primary Examiner—Ira S. Lazarus
Assistant Examiner—Y. Quach
Attorney, Agent, or Firm—Emch, Schaffer, Schaub & Porcello

[57] ABSTRACT

A photographic light modifier has a frame structure moveable from a closed, substantially planar, position to an open position for attachment to a light source. A pair of pivotally mounted arms are each provided with hooks or loops of a pad member which cooperate with hooks or loops fastened to the engagement surface of the light source for engaging the light modifier thereto.

11 Claims, 4 Drawing Sheets

PHOTOGRAPHIC LIGHT MODIFIER

BACKGROUND OF THE INVENTION

The present invention relates to a light diffuser or modifier for use with light sources in photography. Diffused or indirect lighting is used in both still and motion picture type photography. To achieve an indirect, soft type lighting effect it is desirable to first either directly or indirectly pass the light through a semi-transparent material to break up and diffuse the light rays. Such lighting is generally produced by light sources which are remote from the camera.

Each particular area to be lighted will dictate the type and intensity of light that will be needed. In some situations direct light from the light source without any alteration may be required. In other situations direct light may be too strong or cast overly distinct shadows in which case a more diffuse light will be more desirable. In still other cases an even more indirect diffuse light may be needed to create the proper lighting effect. It is also important to have a great deal of uniformity in the lighting to assist the photographer in properly lighting the subject. One type of light diffuser is disclosed in U.S. Pat. No. 4,757,425 (copy enclosed) which is incorporated herein by reference.

The light diffuser should also be capable of being used with almost any type of light source and preferably may be readily and easily attached to and detached from the light source. It is also desirable to have a light diffuser that is a compact, self-contained unit that is easy to position and use.

It is an object of the present invention to provide a photographic light diffuser or modifier that will yield such lighting through a device that is lightweight, compact, easily transported and readily and easily attached to and detached from the light source.

It is a further object of the present invention to provide a photographic light modifier that is useable with a wide variety of light sources.

Other objects and advantages of the present invention will become more apparent from a further review of the following specification, drawings and claims.

SUMMARY OF THE INVENTION

The present invention relates to a photographic light diffuser or modifier which may be readily and easily attached to and detached from a light source to provide diffused light for photographic purposes. The modifier has a cover positioned over a frame structure which is moveable from a substantially planar position for storage to an open position for attachment to a light source to act as a light diffuser for photographic purposes. The frame structure has a substantially rectangular support member with a pair of arms each of which is pivotally mounted on one of the ends of the rectangular support member for movement from a collapsed position in which the arms are substantially planar to the rectangular support member to an open position for engagement with a light source. According to the present invention, the each of the arms is provided with a pad having releasable engagement means such as loops or hooks which cooperate with opposing loops or hooks mounted on each side of the light source, each of which is formed of synthetic material which adheres when pressed together and is sold under the trademark "VELCRO". The pads are pivotally engaged to the end of each of the arms.

DESCRIPTION OF THE PREFERRED EMBODIMENT

Figure 1:
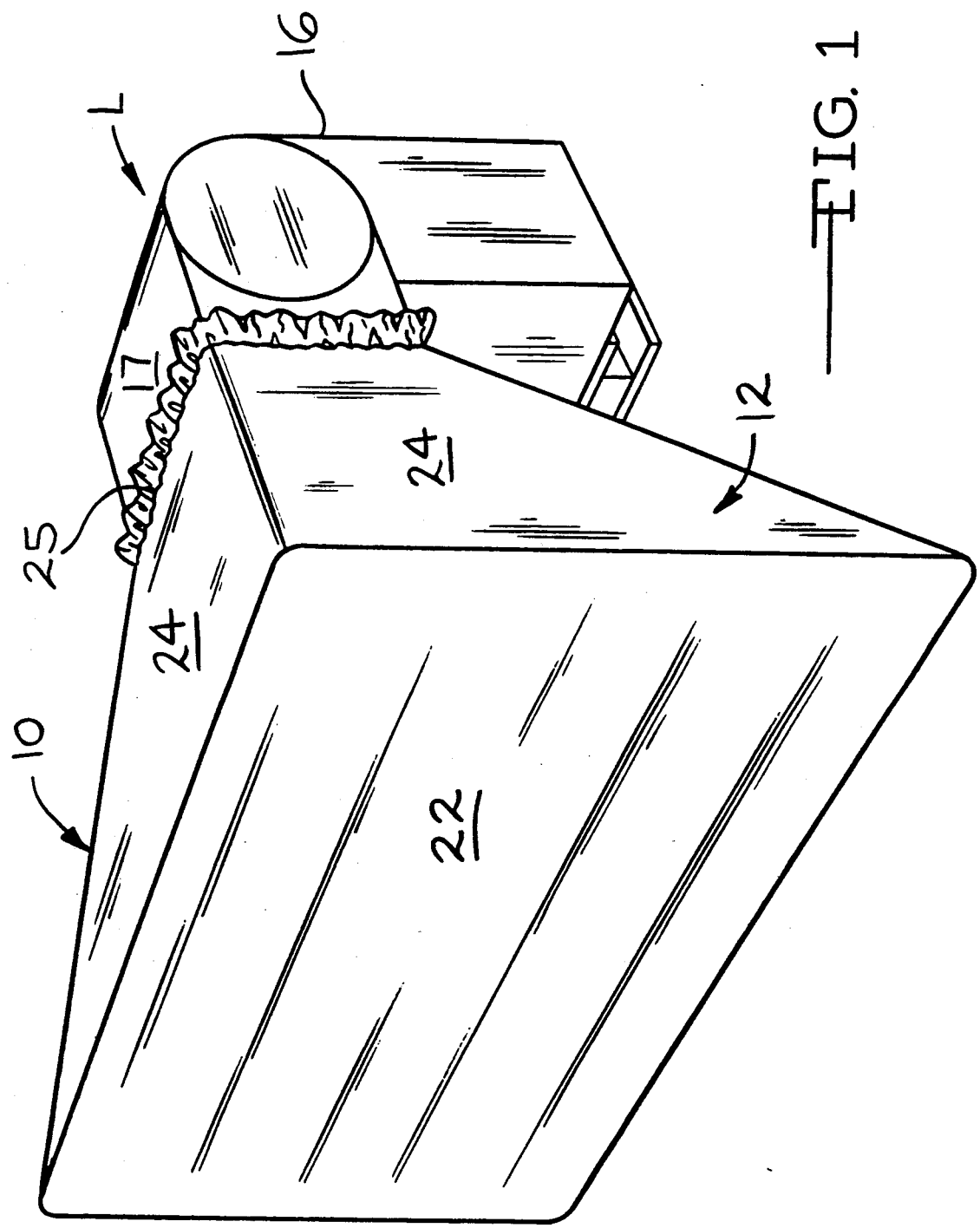
FIG. 1 is a perspective view showing the photographic light modifier of the present invention secured to a light source.

Referring now to the drawings, there is shown in FIG. 1 a photographic light modifier 10 of the present invention secured to a light source L. As can be seen more clearly in FIG. 2 the modifier photographic light 10 includes a frame assembly generally designated by the numeral 11 over which is positioned a cover 12.

The light source L may be of any desired shape or configuration but will generally include a glass panel 14 through which the light is emitted and a housing 16 supporting the glass panel 14 and the light source. As shown, the housing 16 includes an upper panel 17, a lower panel 18 and a pair of flat side panels 19 and 20 which cooperate to support the glass panel 14.

The cover 12 of the photographic light modifier 10 includes a translucent panel 22 which, when the modifier photographic light 10 is fastened to the light source 12, is spaced from and generally parallel to the glass panel 14. The cover also includes a reflective member 24 extending from the translucent panel 22 to a free end 25 pulled together by an elastic member (not shown) which defines an opening which is expansible for receiving the end of the housing 16 supporting the glass panel 14. Thus, as can be seen in FIG. 1, the elastic causes the free end 25 of the cover 12 to snugly engage the top upper panel 17, bottom lower panel 18 and flat side panels 19 and 20 of the housing 16 so that light being emitted through the glass panel 14 will be captured within the cover and be emitted in a diffused manner through the translucent panel 22.

Figure 2:
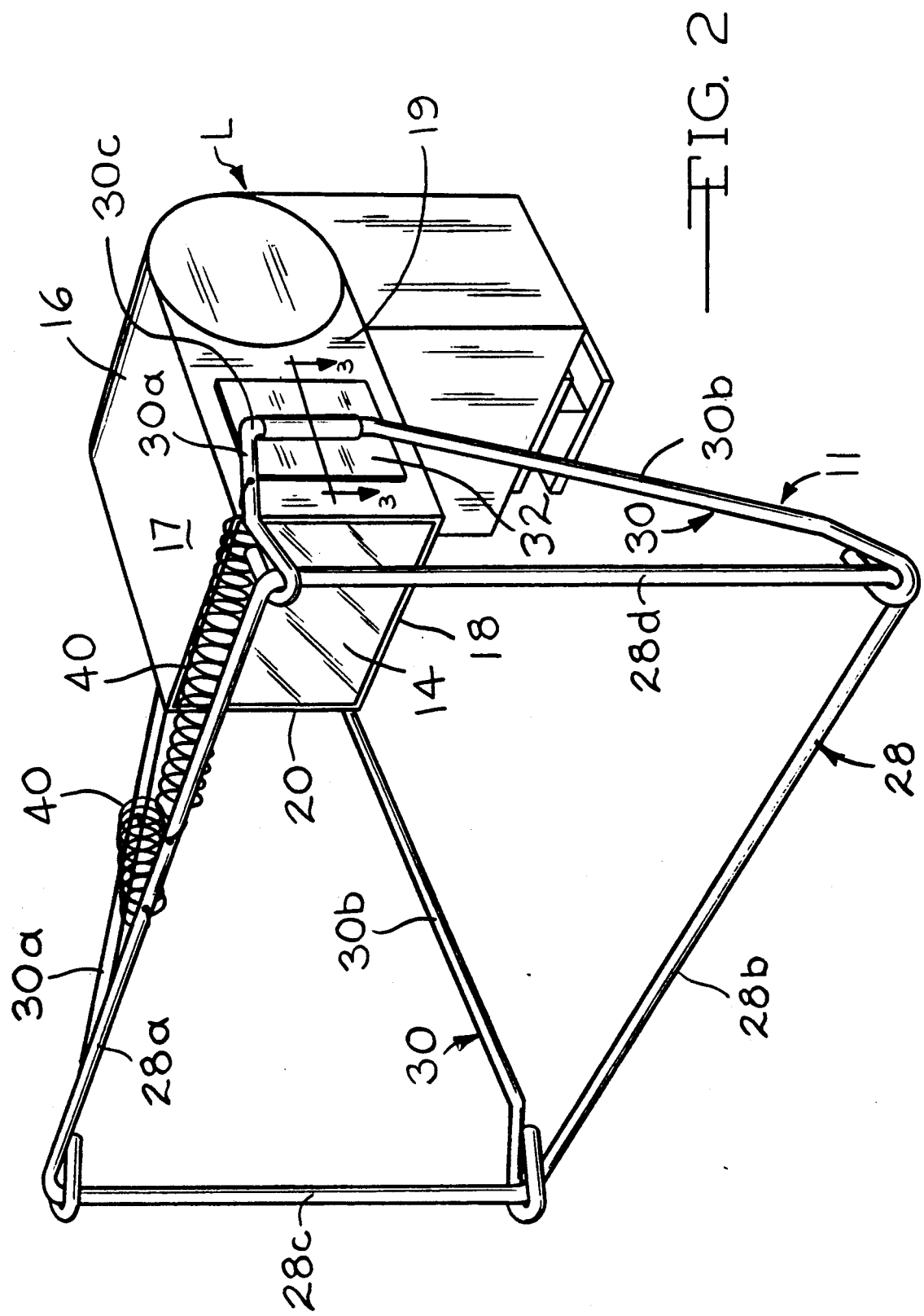
FIG. 2 is a view similar to FIG. 1 but showing only the frame without the cover attached thereto and with the frame secured to a light source.
Figure 4:
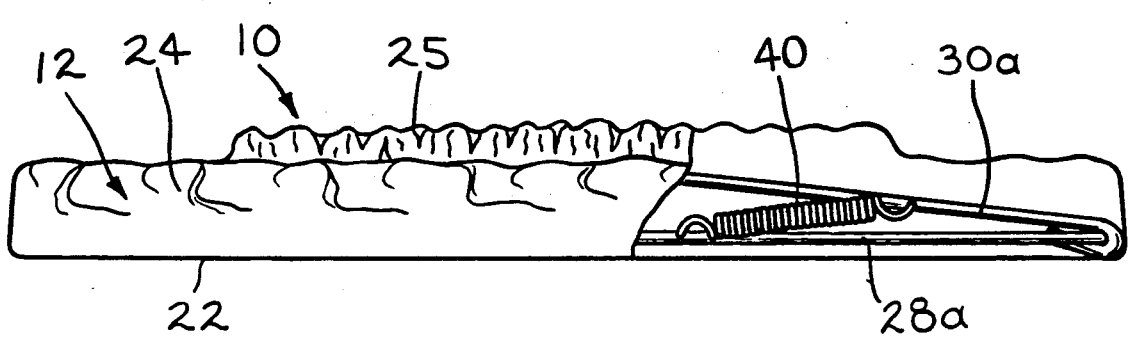
FIG. 4 is a plan view showing the light modifier of the present invention in the collapsed position.

As can be seen in FIGS. 1 and 2, the translucent panel 22 has a generally rectangular shape; however, other configurations may be used. The reflective member 24, when the modifier photographic light 10 is engaged to the light source L, defines a series of wall sections each having a generally trapezoidal shape with a long base at the edge toward the translucent panel 22 and a shorter top at the edge adjacent the free end 25. As can be seen in FIG. 4, when the light modifier 10 is removed from the light source L to a collapsed position, the reflective member 24 simply becomes bunched.

Referring now to FIG. 2, the frame 11 includes a rectangular support member 28 having an upper leg 28a, a lower leg 28b and side legs 28c and 28d. The support member 28, although shown as rectangular in shape, may have any desired shape including, but not limited to, circular, oval, hexogonal, trapezoidal or the like. Preferably, its shape will be similar to the shape of the translucent panel 22. The rectangular support member 28 may be formed of a semi-rigid wire of a size to provide sufficient rigidity to support the cover and yet light enough in weight to be readily handled.

Pivotally secured to each of the end members 28c and 28d of the rectangular support member 28 is an arm 30. The arms 30 each include an upper segment 30a, a lower segment 30b which taper toward one another and are joined together by a central segment 30c which preferably has a length substantially shorter than the height of the flat side panels 19 and 20 of the light source L. Each of the upper and lower segments 30a and 30b have their ends looped around the respective side legs 28c and 28d of the rectangular support member 28. Thus, looking at FIG. 2, the arm 30 on the right side of the rectangular support member 28 has the free end of upper segment 30a looped around and pivotally secured to the upper end of the side leg 28d at its juncture with the upper leg 28a and the free end of lower segment 30b looped around and pivotally secured to the lower end of the side leg 28d adjacent the lower leg 28b.

Rotatably engaged to each of the central segments 30c is a pad member 32 comprising an inner flat member 33 and an outer member 34 fastened thereto which has been shaped to form a protrusion 35 defining a passageway between the inner flat member 33 and outer member 34 for receiving the central segment 30c of the arm 30. (See FIG. 3).

Figure 3:
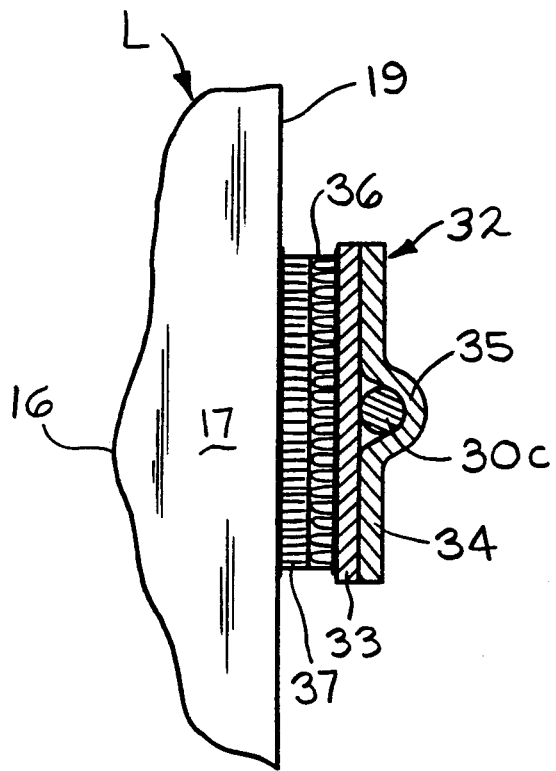
FIG. 3 is a sectional view taken through line 3—3 of FIG. 2.

Secured to the surface of the inner flat member 33 opposite the outer member 34 are loops 36 of a synthetic material which adheres to hooks 37 of synthetic material which adheres when pressed together and is sold under the trademark "VELCRO". However, other types of fasteners which stick together may be used such as those marketed by the industrial specialties division of 3M Corporation, St. Paul, Minn. sold under its registered trademarks "SCOTCHMATE" and "DUAL LOC". As can be seen in FIG. 3, the hooks 37 are permanently adhered to the housing 16 of the light source L, with one of the hooks 37 being fastened to the flat side panel 19 and another of the hooks (not shown) adhered to the opposite flat side panel 20.

Each of the arms 30 has fastened thereto a spring 40. Each of the springs 40 has its opposite end fastened to the upper section 28a of the rectangular support member 28 and functions to urge the arm 30 to which it is attached toward a collapsed position. Thus, as may be seen in FIG. 2, the springs 40 are pulling the arms toward one another and firmly into engagement with the housing 16 of the light source L.

As may be seen in FIG. 4, after removal of the photographic light modifier 10 from the light source L, the arms 30 will be pulled by the springs 40 to a position substantially parallel to the rectangular support with the cover 12 collapsed therearound. For purposes of clarity, the arms 30 in FIG. 4 are shown positioned at a slight angle to the plane of the rectangular support member 28.

As will be appreciated, the fastening means provided by the pads 32 and their loops 36 cooperating with the hooks 37 on the housing 16 permit the photographic light modifier 10 to be easily affixed to and disassembled from a light source L and, upon such removal, to be easily collapsed for storage and transport to another location. Since the pads 32 may be rotated about the center section 30c of the arms 30, they to may be folded to a position substantially parallel with the rectangular support member 28 when in the collapsed position. Additionally, they may be readily and securely fastened to the housing 16 irrespective of whether the flat side panels 19 and 20 of the housing 16 are parallel to one another or taper toward or away from one another.

Figure 5:
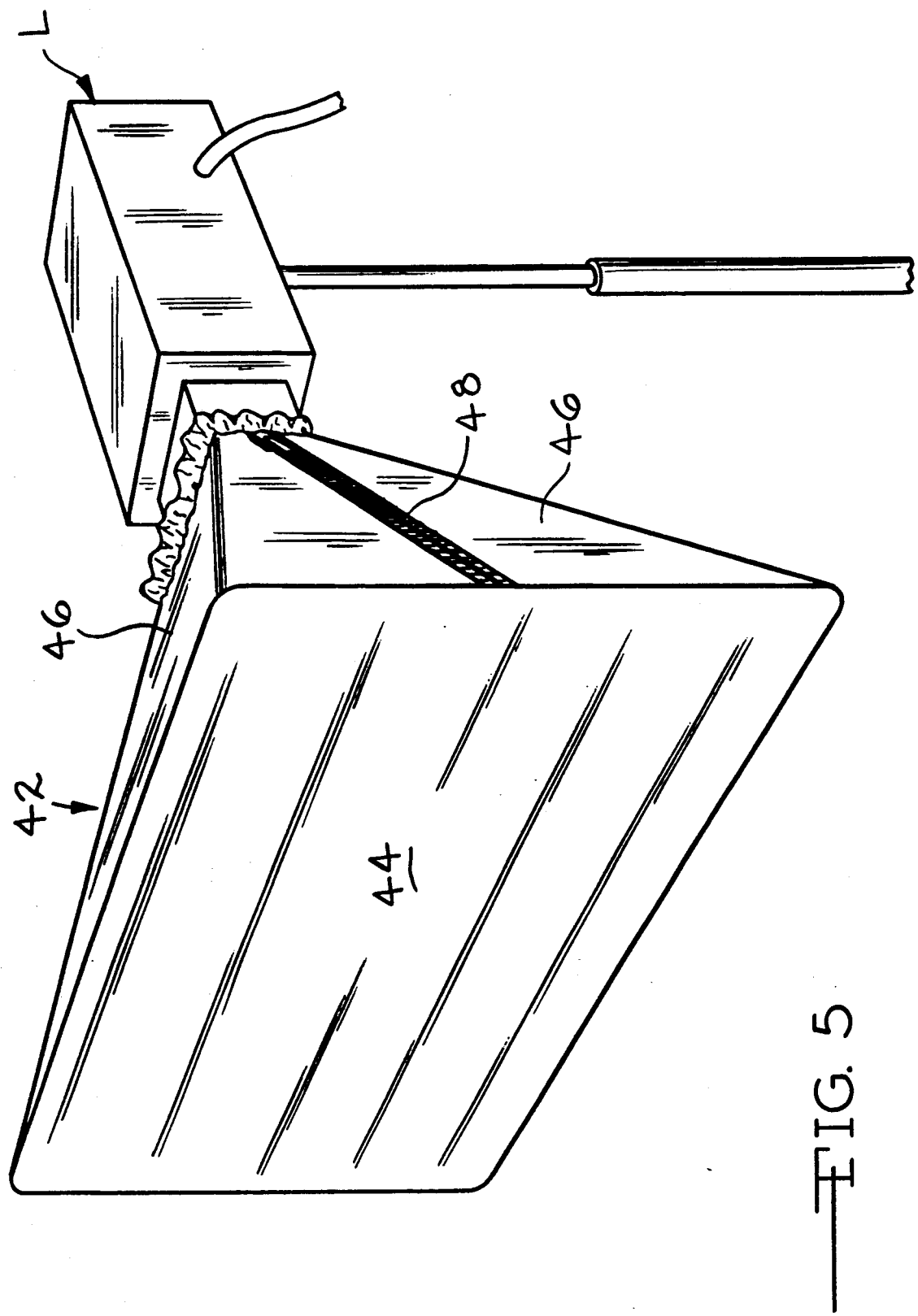
FIG. 5 is a view similar to FIG. 1 showing a modified embodiment.

Referring now to FIG. 5, there is shown a modified embodiment particularly well adapted to fastening over a light source L having a relatively large housing. Under this embodiment there is provided a cover 42 having a translucent panel 44 and a reflective member 46. Under this embodiment the reflective member 46 has a zipper 48 on one side permitting access to the interior of the cover and also permitting the pads of the frame to be engaged to the Velcro hooks on the sides of the light source housing prior to engagement of the cover 42 to the light source.

Other modifications will be readily apparent to those skilled in the art. For, example, the modifier could be used with a light source having a domed cover (glass or plastic) or simply a bulb with no plate or cover so long as there is a frame, housing or other support structure to which the pad members may be engaged. Additionally, if the springs are strong enough to firmly engage pads on arms to pads on the support structure, hook and loop type fasteners would not be required and the pads could simply be provided with rubber or pliable faces, each having a surface which will hold the modifier in place without slipping. Additionally, the frame is not necessarily planar but could follow a curved path. Accordingly, the scope of the present invention should be limited only to the scope of the appended claims.

I claim:

1. A light modifier for use with a light source having a face through which light is emitted and an engagement surface positioned on laterally opposite sides of said face, said light modifier comprising:
   a frame defining a plane that is spaced apart from said face of said light source;
   at least one arm member extending from opposite sides of said frame in a direction towards said light source;
   a pad that is spaced apart from said frame rotatably positioned on an end of said at least one arm member, said pads being disposed to contact said engagement surface on said light source to releasably mount said light modifier to said light source; and,
   a cover positioned over said frame, said at least one arm member and enclosing said face of said light source, a portion of said cover positioned on said plane defined by said frame being translucent.

2. A light modifier according to claim 1, wherein each of said rotatable pads has fastener means releasably engageable to said engagement surface of said light source.

3. A light modifier according to claim 2, wherein each set of cooperating fastener means and engagement surface includes hook members and loop members.

4. A light modifier according to claim 1, wherein said cover includes a reflective member extending from said portion of translucent cover over said least one arm member to an open end encircling said face.

5. A light modifier according to claim 4, wherein said reflective member includes a zipper extending from said open end toward said portion of translucent cover.

6. A light modifier according to claim 1, wherein said at least one arm member is mounted for rotation from a position substantially parallel to said plane to said position disposed to contact said engagement means on said light source.

7. The light modifier according to claim 1 wherein said frame is substantially parallel to said face of said light source.

8. A light modifier for use with a light source through which light is emitted and first engagement means positioned on laterally opposite sides of said light source, said light modifier comprising:
 (a) a frame having
  (i) a generally planar support member spaced from said light source;
  (ii) a pair of arm members having first and second ends, said first ends being mounted on opposite sides of said generally planar support member for rotation thereabout from a collapsed position generally aligned with said generally planar support member to an open position at which each of said second ends is adjacent different ones of said first engagement means;
  (iii) pad means rotatably connected to each of said second ends; and,
  (iv) second engagement means mounted on each of said pad means for engagement with said first engagement means; and
 (b) a cover supported on said frame and having
  (i) a translucent panel spaced from said light source, and
  (ii) a reflective member extending from said translucent panel to an open end encircling said light source.

9. A light modifier according to claim 8, wherein said first and second engagement means comprises cooperating fastener members releasably engageable to each other.

10. A light modifier according to claim 9, wherein each set of cooperating fastener members includes (a) hook members and (b) loop members.

11. A light modifier according to claim 8, wherein said reflective member includes a zipper extending from said open end toward said translucent panel.

* * * * *

UNITED STATES PATENT AND TRADEMARK OFFICE
CERTIFICATE OF CORRECTION

PATENT NO. : 5,154,503
DATED : 10/13/92
INVENTOR(S) : Daniel M. Sternsher

It is certified that error appears in the above—identified patent and that said Letters Patent is hereby corrected as shown below:

Column 2, line 23, delete "modifier" and after the word "light" insert --modifier--.

Column 2, lines 34-35, delete "modifier" and after the word "light" insert --modifier--.

Column 2, line 52, delete "modifier" and after the word "light" insert --modifier--.

Column 4, Line 59, insert --at-- before "least".

Column 4, Line 67, delete "means" and insert --surface--.

Signed and Sealed this

Second Day of November, 1993

Attest:

BRUCE LEHMAN

Attesting Officer

Commissioner of Patents and Trademarks